May 12, 1959 W. G. MILLER 2,885,953
BALER FEED MECHANISM
Filed Oct. 27, 1955 3 Sheets-Sheet 1

INVENTOR.
WILLIAM G. MILLER
BY James E. Nilles
ATTORNEY.

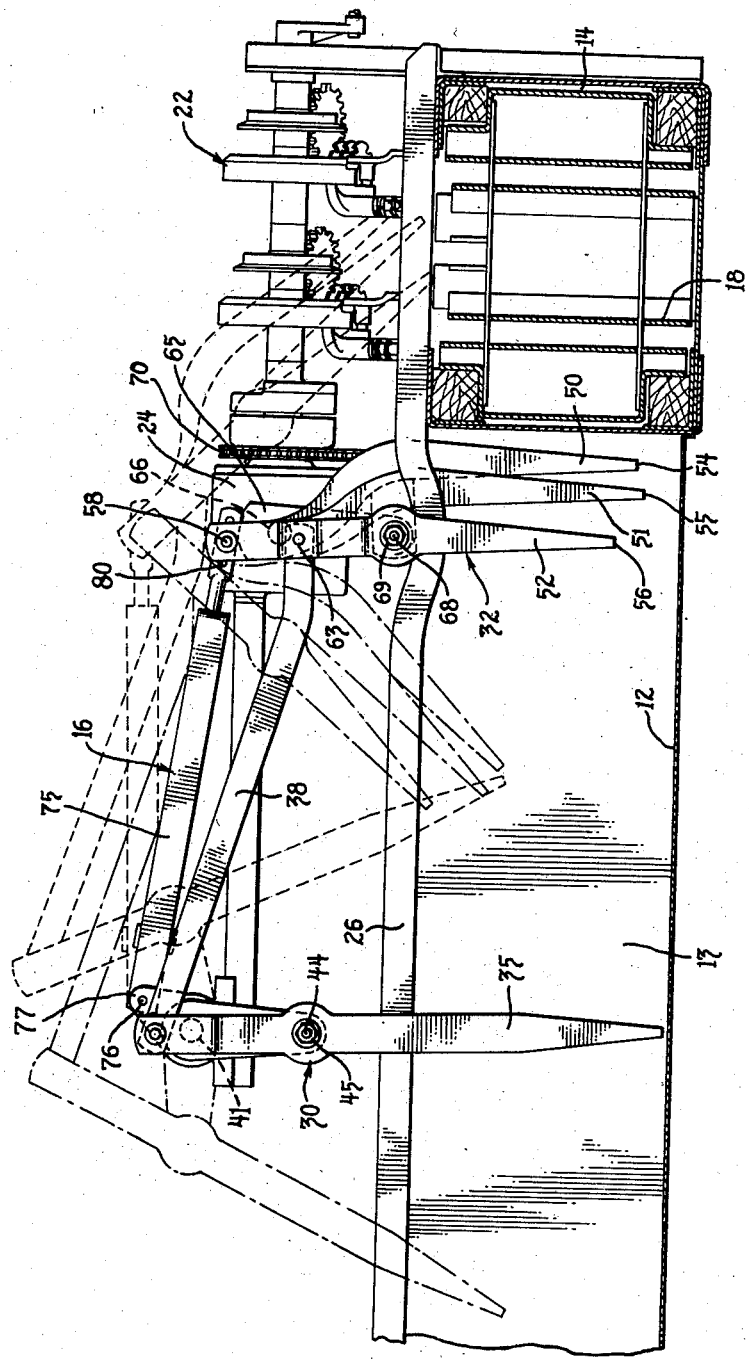

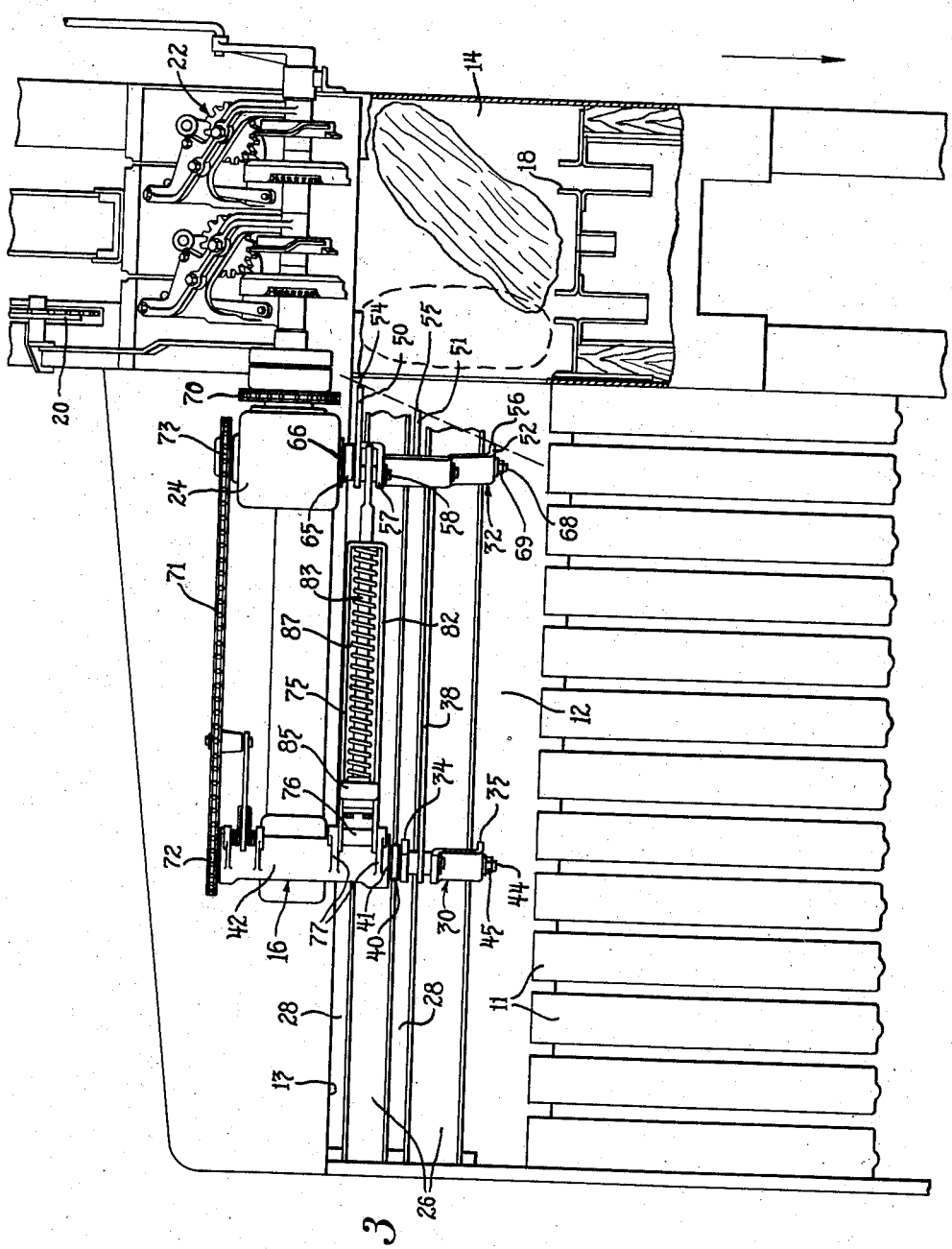

United States Patent Office 2,885,953
Patented May 12, 1959

2,885,953

BALER FEED MECHANISM

William G. Miller, Toronto, Ontario, Canada, assignor to Massey-Ferguson Inc., a corporation of Maryland Application October 27, 1955, Serial No. 543,228

3 Claims. (Cl. 100—142)

This invention relates to machines for baling crop material and finds particular utility in pickup or field balers.

The subject matter of this invention is in the nature of an improvement over the transfer mechanism shown in the co-pending U.S. patent application Serial Number 504,080, filed April 26, 1955.

An object of this invention is to provide an improved feed mechanism for a baling chamber which places the charge of material in the chamber in such a manner so as to result in a finished bale having more uniform density throughout and being of generally better shape.

It is an object of this invention to provide a feed mechanism for a baler, the inboard packer of which is so constructed and arranged so as to enable each charge of material to be pushed farther into the baling chamber and distributed evenly across the width of the chamber, and held there for a longer period of time before it is necessary to remove the packer to avoid injury from being struck by the plunger.

It is another object of this invention to provide a feed mechanism for a baler which results in a smooth flow of crop material in an advantageous and gently curving direction.

Other objects and advantages will become more apparent from the following detailed description of the preferred embodiment illustrated in the accompanying drawings in which:

Figure 2 is a front elevational view, in section, showing the feed mechanism in its various positions.

Figure 3 is a top plan view, with certain parts broken away and others in section for the sake of clarity.

Figure 1:
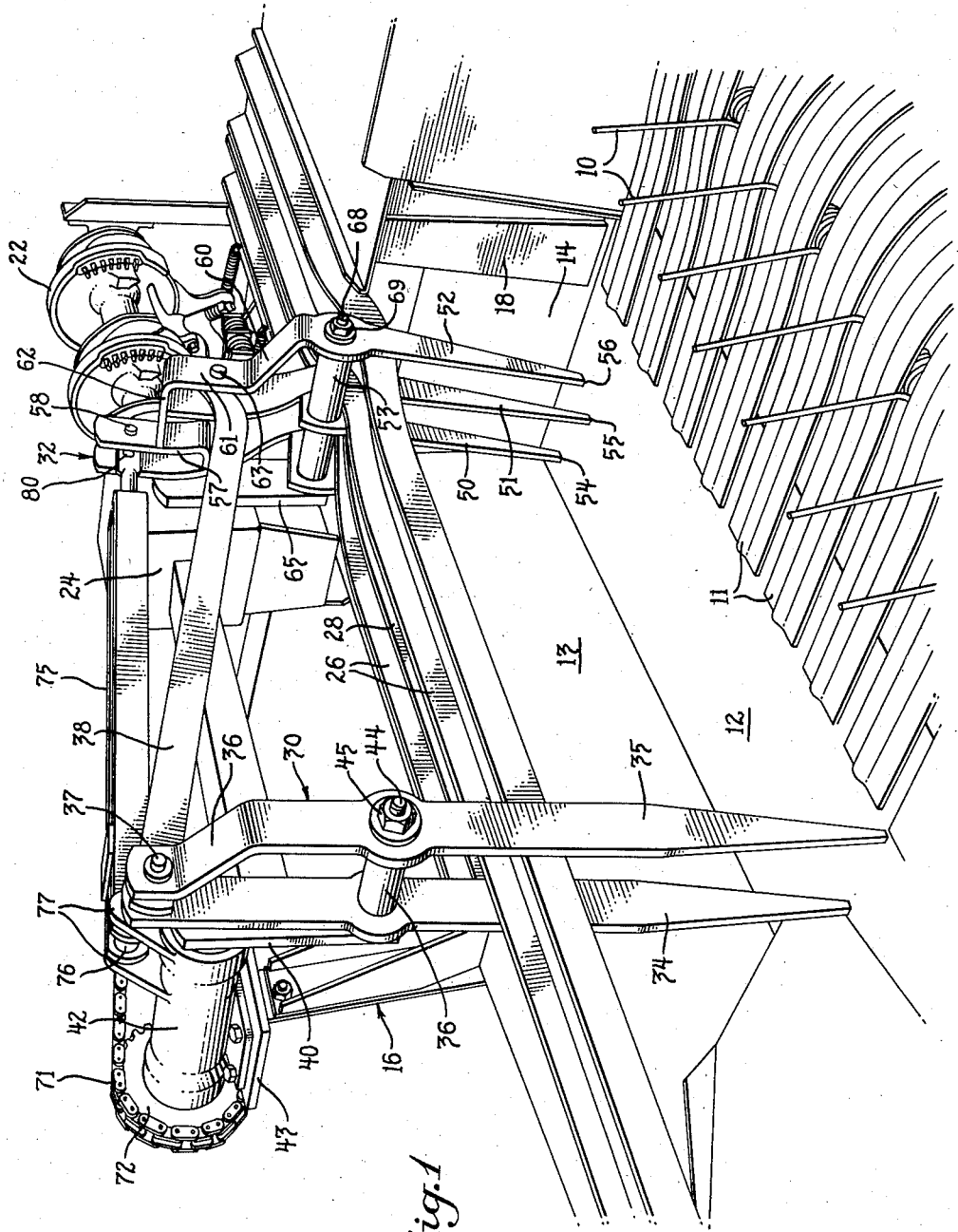
Figure 1 is a perspective view of the improved feed mechanism, taken from a front outside direction.

The machine shown in the drawings is adapted to be drawn over the field at a constant attitude and pick up the crop, which, generally, has previously been formed into a windrow. The machine travels in the direction indicated by the arrow in Figure 3, and the crop material is picked up by the conventional disappearing fingers 10 (Figure 1) which are withdrawn beneath the curved guards 11 as they approach the platform 12 upon which the crop is then deposited. The crop is then fed transversely along the platform 12 and rear wall 13 of the feed chamber and into the baling chamber 14 by means of the feed mechanism 16. The packing plunger 18 reciprocates in the well known manner in timed relation to the action of the feed mechanism 16. The timing is such that each charge of material is fed into the chamber 14 when the plunger 18 is retracted and the feed mechanism 16 is withdrawn from the chamber in time to avoid interference with the advance of the plunger. Successive charges of material are fed into the chamber by the feed mechanism 16 and these charges are compressed against material previously fed into the chamber and pushed rearwardly in the chamber until the bale has been built up to the desired dimensions. When the bale reaches a desired size, as determined by a metering device 20, it is automatically tied by the conventional knotter mechanism designated generally as numeral 22. The knotter 22 is driven from the gear box 24 which in turn receives its power from a power source (not shown) located either on the baling machine or on the tractive vehicle to which the baler may be attached.

The material, as it is moved transversely in the feed chamber 12—13, is confined therein by hold-down rails 26 provided at the top of the chamber and spaced apart to define slots 28 for the accommodation of the elements of the feed mechanism to be presently described.

The feed mechanism 16 comprises two packer finger assemblies, including an outboard assembly 30 and an inboard assembly 32 operating in timed relation to advance the crop material through the feed chamber in successive charges. More particularly, the finger assemblies are supported and driven with a combined rotary and oscillating movement that enables the outboard packer to sweep along successive charges of material into position where it can be picked up by the inboard packer. The latter continues the sweeping motion, sweeping the material into the baling chamber 14. These movements of the packer are coordinated with the reciprocation of the baling plunger as will appear.

As best shown in Figure 1, the finger assembly 30 comprises two elongated bars 34, 35 assembled in spaced parallel relation and rigidly secured together as a unit by a sleeve element 36 to which the bars are suitably attached as by welding. The bars are apertured adjacent their connection with the sleeve element so that the latter is enabled to constitute a supporting bearing for the assembly. The longer portions of the bars extend below the sleeve 36 and constitute the material-engaging finger elements of the assembly. The upper portions of the bars are extended above the sleeve, the rear bar 34 being straight while the front bar 35 has its upper section 36 bent rearwardly to bring its upper end closely adjacent the rear bar and cooperating with it in supporting a pin 37 pivoting one end of a link 38. This link affords a connection with the inboard packer 32 as will appear later. Thus the finger elements 34, 35 and their bearing sleeve 36 constitute a unitary structure that is both strong and rigid.

The outboard packer 30 is supported for bodily rotation in a circular orbit and for pivotal movement about the axis of the sleeve 36 by means of a crank 40 fixed to one end of a shaft 41 journaled in a bearing 42 supported on a plate member 43 forming a part of the machine frame. The outer end of the crank arm 40 carries a stub shaft 44 which extends through and has a bearing in the sleeve 36. A nut 45 threaded on the end of the shaft 44 retains the packer 30 thereon.

The companion inboard packer 32 comprises three elongated spaced bars 50, 51 and 52 which are rigidly assembled as a unit on a sleeve element 53 to which the bars are welded. Each of the bars is extended below the sleeve 53 to form material-engaging finger elements which terminate at their lower ends at 54, 55 and 56, respectively. The rear bar 50 extends upwardly from the sleeve and has welded thereto an L-shaped bracket 57 which, with the bar 50, defines a yoke for supporting a strut anchoring pin 58.

As best shown in Figure 1, the front bar 52 has its upper end portion bent to present an inclined section 60, a vertical section 61 and a horizontal uppermost section 62 which is welded to bracket 57. The middle bar 51 is welded to section 62 and cooperates with the vertical section 61 to support a pin 63 for anchoring the link 38 to the inboard packer assembly 32.

The inboard packer 32 is likewise supported for bodily rotation and for oscillation about the axis of the sleeve 53, the rotational axis being parallel to that of the companion packer 30 and located at a slightly lower level (Figure 2). The support for the packer 32 is provided by a crank arm 65 fixed on the forward end of shaft 66 journalled in the gear box 24 previously mentioned. Crank arm 65, adjacent its outer end, carries a pin 68 extending through and journalled in sleeve 53 of the packer 32. A nut 69 is threaded on the end of pin 68 and retains the packer 32 thereon.

Power is supplied to gear box 24 and to knotter 22 through chain 70 from a power source (not shown). Power for driving shafts 41 and 66 at the same speed is taken from the gear box and these two shafts are connected by chain 71 trained over sprockets 72, 73 which are keyed to their respective shafts 41, 66. As the shafts 41, 66 rotate, the packers 30, 32 are traversed bodily in a circular path or orbit. To impart oscillating motion to the finger assemblies to sweep their lower ends through the feed chamber, the packer 32 is anchored at its upper end to a rigid portion of the frame structure. This anchoring is effected by a link 75 connected to the packer 32 at one end by pivot pin 58 and having its other end pivoted on pin 76 which is carried between a pair of upstanding lugs 77 rigid with bearing 42. Oscillating movements of the inboard packer 32 are transmitted to the outboard companion packer through the medium of the link 38 which, as previously explained, is connected at opposite ends to the packers by pins 37 and 63.

By referring to Figure 2, the character of the movements imparted to the packers by the exemplary linkage will be readily seen. As crank arm 65 swings through the lower half of its arcuate path, the packer 32 moves from the position shown in dotted line downwardly to that shown in full line and thence upwardly to that shown in dot-dash line. When the crank arm is in its lower position, the packer is held in a generally upright position with the fingers extending closely adjacent the platform 12.

By reason of the connection provided by the link 38, the packer 30 sweeps through the arc between the positions shown in dotted and dot-dash lines. In its continued movement, the fingers of packer 30 sweep close to the platform 12 and carry the material along the feed chamber and into a position in which the companion packer 32 can engage such material in its next downward sweep.

As shown in Figure 2, the fingers of the inboard packer 32 are withdrawn from the packing chamber 14 in a substantially endwise movement. The angle at which these fingers are withdrawn can be varied by the aperture 80 in link 75 which is selected for the point of connection to packer 32. This inboard packer angle of withdrawal is adjustable for the various crop conditions which may be encountered. If too flat an angle is used, i.e., not enough vertical component of direction, the fingers will have too much of a "lifting" effect on the material in the bale chamber at the end of its stroke.

The link 75 is constructed for yieldable extension when the movement of either of the packers is blocked, thereby preventing any damage. For this purpose link 75 is made up of two telescoping, resiliently connected sections. As shown in Figure 3, one section of the link comprises an elongated U-shaped member 82 having parallel legs anchored on pin 76. The central portion of member 82 is apertured to slidably receive the other link section which takes the form of a rod 83 having a head at its outer end apertured for the reception of pin 58. Fixed on the other end of rod 83 is a guide element 85 fitted between the legs of member 82 and adapted to slidably engage therewith to guide the link sections in their relative endwise or telescoping movements. Spring 87 is interposed between guide 85 and the central portion of member 82 and acts to yieldably maintain the link sections in a contracted condition. The spring yields to permit extension of the link when resistance to movement of either packer exceeds a predetermined value.

It will be noted that bars 50, 51 and 52 are not aligned in a front and rear direction but, rather the rear bar 50 is curved intermediate its length which extends its farther towards the baling chamber 14. Similarly, the middle bar 51 is curved intermediate its length, but not to the same extent as is bar 50. The front bar 52 is generally straight (Figure 2) in a front and rear direction and is slightly shorter in length at its lower end.

With such an arrangement, the lower ends 54, 55 and 56 of the bars 50, 51 and 52 lie in a line disposed at an angle to the baling chamber on the order of 23 degrees, as indicated by the broken line in Figure 3. Experience has indicated that this particular angle is very satisfactory in placing the charge of material in the baling chamber for most uniform bale density throughout the bale width and at the same time allowing the rear finger 50 the maximum time of "dwell" within the bale chamber before it must be removed for plunger clearance. If this angle is greater, i.e., finger 50 extended even further into the chamber than finger 52, the tendency is to concentrate too much of the charge at the outside of chamber 14. Conversely if a flatter angle is used, that is, the lower end of the packer 32 parallel to the baling chamber, the concentration of material is at the inner side of bale chamber 14. By staggering the fingers in this manner, the rear portion or finger 50 is permitted to enter the chamber farther than if the fingers were aligned. In other words, the forward portion of the lower end of packer 32, that is finger 52, which is nearest the plunger 18 is the critical one as far as timing is concerned for plunger clearance; it must be removed from the bale chamber first. As shown in Figure 3, the charge indicated by the solid line is its approximate position when using this staggered finger arrangement. The conventionally positioned charge is indicated by the dotted line. With the use of this invention a more uniform density bale is obtained, as well as bale of better and more definite shape, i.e., one which is squarer in cross-section and sharper at the corners.

Furthermore, with the fingers of the inboard packer so staggered, the crop material, especially that delivered to the platform 12 at its inner end, flows in a gentle curve indicated by the arrow in Figure 3, and is not required to make an abrupt, right angle change of direction.

What is desired to be secured by Letters Patent is:

1. In a baler having a baling chamber and a plunger reciprocable therein, a feed chamber arranged transversely and extending from one side of said baling chamber and having a discharge opening at one end communicating with said baling chamber, said feed chamber being open at its forward side to receive material, an inboard and outboard packer spaced apart longitudinally of the feed chamber and having their lower ends extending into said feed chamber, means pivotally supporting said packers intermediate their ends, said supporting means being rotatable about axes disposed above and transversely of the feed chamber so as to traverse the packers bodily in circular paths, anchor means connecting the upper end of one of said packers with said baler, a rigid link connecting the upper ends of said packers to one another, whereby upon rotation of said supporting means the said lower ends of said packers will swing through arcuate paths within said feed chamber, said outboard packer being adapted to sweep material into the path of said inboard packer and the latter being adapted to sweep the material through said discharge opening into said baling chamber, said inboard packer comprising, a plurality of elongated fingers spaced apart in a front and rear direction and adapted to extend downwardly into said feed chamber to the rear of said plunger and having their lower ends arranged at an angle in a horizontal plane to the direction of plunger reciprocation, the rearmost finger being adapted to extend farther into said baling chamber than said frontmost finger.

2. A device as defined in claim 1 further characterized in that said angle is between the range of 19 to 27 degrees.

3. A device as defined in claim 1 further characterized in that said anchor means is fixedly adjustable in length so as to vary the throw of the said inboard packer.

References Cited in the file of this patent

UNITED STATES PATENTS

| | | |
|---|---|---|
| 521,657 | Johnson | June 19, 1894 |
| 2,608,929 | Paradise et al. | Sept. 2, 1952 |
| 2,647,355 | Luke | Aug. 4, 1953 |
| 2,786,902 | Myers | Oct. 9, 1956 |